United States Patent
Chen et al.

(10) Patent No.: US 10,330,968 B2
(45) Date of Patent: Jun. 25, 2019

(54) TOUCH SENSING STRUCTURE FOR DISPLAY PANEL WITH LOW IMPEDANCE BRIDGE STRUCTURE

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventors: Chun-Ming Chen, Guangdong (CN); Hsuan-Man Chang, Guangdong (CN)

(73) Assignees: INTERFACE TECHNOLOGY (CHENGDU) CO., LTD., Sichuan (CN); INTERFACE OPTOELECTRONICS (SHENZHEN) CO., LTD., Guangdong (CN); GENERAL INTERFACE SOLUTION LIMITED, Miaoli County (TW)

(*) Notice: Subject to any disclaimer, the term of this patent is extended or adjusted under 35 U.S.C. 154(b) by 57 days.

(21) Appl. No.: 15/681,446

(22) Filed: Aug. 21, 2017

(65) Prior Publication Data

US 2019/0018270 A1     Jan. 17, 2019

(30) Foreign Application Priority Data

Jul. 12, 2017 (CN) .......................... 2017 1 0566137

(51) Int. Cl.
| | |
|---|---|
| *G02F 1/1333* | (2006.01) |
| *G02F 1/1343* | (2006.01) |
| *G06F 3/041* | (2006.01) |
| *G06F 3/044* | (2006.01) |

(52) U.S. Cl.
CPC ........ *G02F 1/13338* (2013.01); *G02F 1/1343* (2013.01); *G06F 3/044* (2013.01); *G06F 3/0412* (2013.01); *G06F 2203/04111* (2013.01)

(58) Field of Classification Search
CPC ....................... G06F 2203/04111; G06F 3/044
See application file for complete search history.

(56) References Cited

U.S. PATENT DOCUMENTS

| | | | |
|---|---|---|---|
| 2011/0102367 A1* | 5/2011 | Wang | G06F 3/044 345/174 |
| 2013/0057495 A1* | 3/2013 | Wang | G06F 3/044 345/173 |
| 2017/0277308 A1* | 9/2017 | Zeng | G06F 3/044 |

* cited by examiner

*Primary Examiner* — Chun-Nan Lin
(74) *Attorney, Agent, or Firm* — CKC & Partners Co., LLC

(57) ABSTRACT

A touch sensing structure includes a substrate, a first electrical conductive electrode, a second electrical conductive electrode, an insulating layer and a bridge electrode. The first electrical conductive electrode includes a plurality of first regions covering the surface of the substrate and the first regions are interconnected by a connection electrode. The second electrical conductive electrode includes a plurality of second regions covering the surface of the substrate. The insulating layer covers the first and second electrical conductive electrodes and the connection electrode. The bridge electrode goes beyond the connection electrode to connect immediately-adjacent two of the second regions, and the bridge electrode pass through two through holes of the insulating layer to connect immediately-adjacent two of the second regions. An included angle between the boundary edge of each of the two through holes and the second contour edge of the second electrical conductive electrode is less than 10 degrees.

9 Claims, 5 Drawing Sheets

TOUCH SENSING STRUCTURE FOR DISPLAY PANEL WITH LOW IMPEDANCE BRIDGE STRUCTURE

RELATED APPLICATION

This application claims priority to China Application Serial Number 201710566137.7 filed Jul. 12, 2017, which is herein incorporated by reference.

BACKGROUND

Field of Invention

The present invention relates to a touch sensing structure and, more particularly, to a touch sensing structure of a display panel.

Description of Related Art

In recent years, the current mobile device or screen touch panel technology utilizes two touch electrodes along two different axes on the transparent substrate to detect the touch position. Thus, when a touch occurs, the touch object changes the distribution of the coupling capacitance at the touch position, and the change of the coupling capacitance can be detected by the two touch electrodes along two different axes so as to achieve the detecting.

However, in order to allow the two axial electrodes to be insulated from each other, one of the axial electrodes requires a bridging structure to span the other axial electrode, and it is necessary to form a through-hole on the insulating layer allowing the bridging structure to pass through and connecting the electrode patterns at two both ends.

The shorter the bridging structure can be designed, the overall impedance of the bridge structure can be reduced as much as possible, but the process of forming the through-hole on the insulating layer requires a safe distance to the process tolerance so as to manufacture a qualified product.

How to reduce the overall impedance of the bridge structure has been one of the bottlenecks on which the sensing electrode technology seeks to bring a breakthrough.

SUMMARY

The present disclosure provides a touch sensing structure for a display panel including a substrate, a first electrical conductive electrode, a second electrical conductive electrode, an insulation layer and a bridge electrode. The first electrical conductive electrode includes a plurality of first sections to cover over the substrate, the first sections are interconnected by a connection electrode. The second electrical conductive electrode includes a plurality of second sections to cover over the substrate, wherein each immediately-adjacent pair of the second sections has an immediately-adjacent pair of first contour edges, and each second section has second contour edges connected to the first contour edges. The insulation layer is covered over the first, second electrical conductive electrodes and the connection electrode. The bridge electrode extends beyond the connection electrode to electrically interconnect each immediately-adjacent pair of the second sections, the bridge electrode has two opposite ends passing through two through holes of the insulation layer to electrically interconnect each immediately-adjacent pair of the second sections, wherein each through hole has a first boundary edge that is distant from an immediately-adjacent one of the first contour edges by greater than or equal to a safe design distance, each through hole has a second boundary edge, an included angle between the second boundary edge and an immediately-adjacent one of the second contour edges is smaller than 10 degrees.

In one or more embodiments, each second boundary edge is in parallel with an immediately-adjacent one of the second contour edges.

In one or more embodiments, each second boundary edge is distant from the immediately-adjacent one of the second contour edges by greater than or equal to the safe design distance.

In one or more embodiments, the first, second electrical conductive electrodes cover a surface of the substrate, and do not cover the remaining surfaces of the substrate.

In one or more embodiments, each through hole is in the shape of an isosceles trapezoid.

In one or more embodiments, each through hole is in the shape of a hexagon.

In one or more embodiments, the hexagon is a combination of an isosceles trapezoid and a rectangle.

In one or more embodiments, the substrate is made from transparent materials.

In one or more embodiments, the first, second electrical conductive electrodes are made from transparent materials.

In one or more embodiments, the insulation layer is made from transparent materials.

In sum, the touch sensing structure for a display panel is implemented with the new through hole design rule to modify a profile of the through hole to be closer to a profile of the electrical conductive electrode on which the through hole is formed, so as to further shorten an interval between two through holes, thereby reducing the impedance of the bridge electrode passing through the two through holes.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
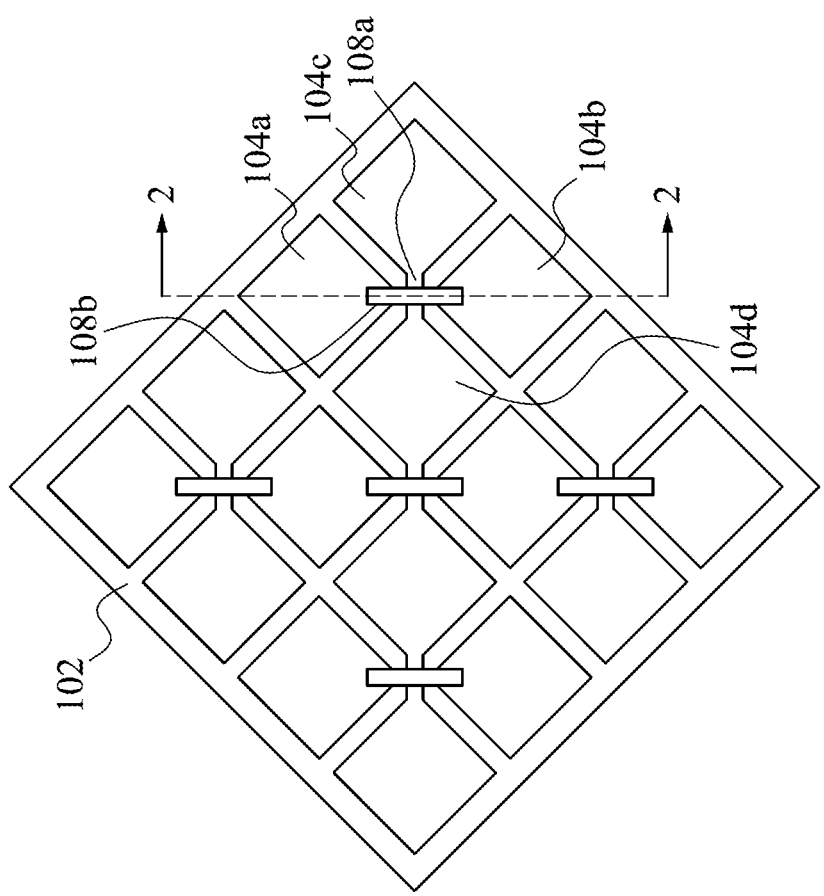
FIG. 1 illustrates a top view of a touch sensing structure for a display panel according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

One aspect of the present invention is to provide a touch-sensitive structure of a display, thereby reducing the overall impedance of the bridge electrode between the conductive electrodes. The touch sensing structure changes the shape of the through hole of both ends of the bridge electrode through the insulating layer so that the two through holes can be closer to the contour edge of the conductive electrode, thereby shortening the pitch of the two through holes and also reducing the overall impedance of the bridge electrode.

Figure 2:
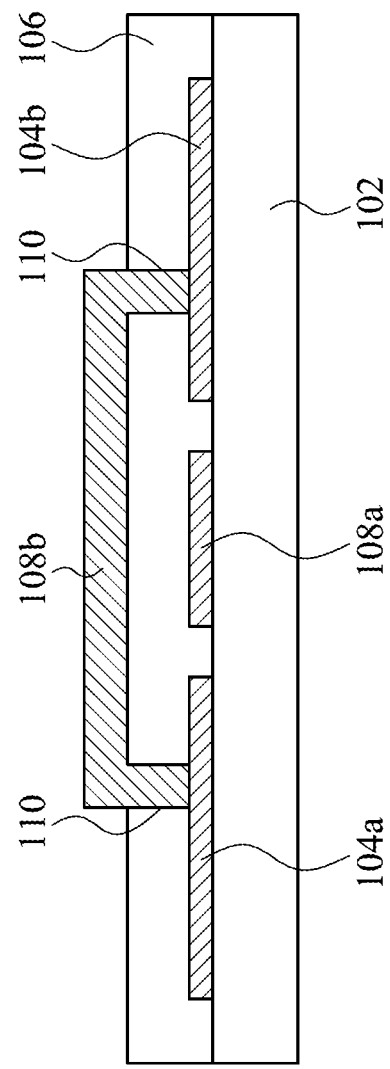
FIG. 2 illustrates a cross-sectional view taken along the cross-sectional line 2-2 of the touch sensing structure in FIG. 1.
Figure 3:
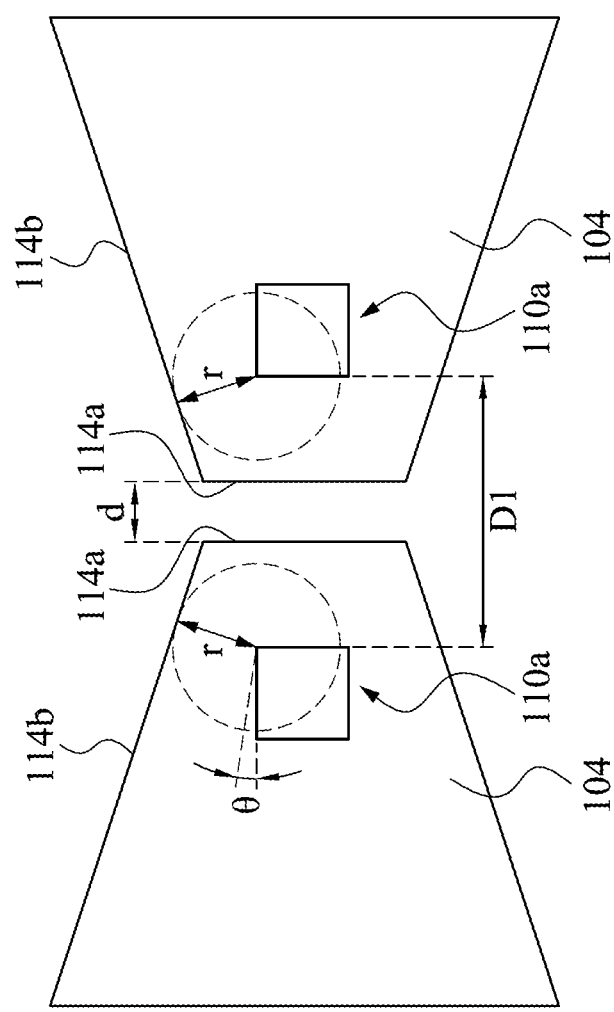
FIG. 3 illustrates an enlarged view of the touch sensing structure according to one embodiment of the present disclosure.

Reference is made to FIGS. 1-3. FIG. 1 illustrates a top view of a touch sensing structure 100 for a display panel according to one embodiment of the present disclosure. FIG. 2 illustrates a cross-sectional view taken along the cross-sectional line 2-2 of the touch sensing structure 100 in FIG. 1. FIG. 3 illustrates an enlarged top view of the touch sensing structure 100 according to one embodiment of the present disclosure.

The touch sensing structure 100 includes a substrate 102, first electrical conductive electrodes arranged along a horizontal direction and second electrical conductive electrodes arranged along a vertical direction. The first electrical conductive electrodes of the same row are interconnected by connection electrodes. For example, first sections (104c, 104d) of the first electrical conductive electrode in FIG. 1 are interconnected by connection electrodes 108a. The second electrical conductive electrodes of the same column are interconnected by bridge electrodes. For example, second sections (104a, 104b) of the first electrical conductive electrode in FIG. 1 are interconnected by bridge electrodes 108b.

Each bridge electrode 108b extends beyond the connection electrode 108a to electrically interconnect each immediately-adjacent pair of the second sections (104a, 104b), and the bridge electrode 108b has two opposite ends passing through holes 110 of the insulation layer 106 to electrically interconnect each immediately-adjacent pair of the second sections (104a, 104b). The insulation layer 106 is covered over all the first, second electrical conductive electrodes and the connection electrode. In this embodiment, all the sections (104a, 104b, 104c, 104d) and the connection electrode 108a are formed along the same horizontal level by the same process step. In this embodiment, the first, second electrical conductive electrodes are electrically insulated by the insulation layer 106, and the bridge electrode 108b and the connection electrode 108a are also electrically insulated by the insulation layer 106.

In this embodiment, the substrate 102 may be a transparent substrate, e.g., a glass substrate or other transparent substrate. The first, second electrical conductive electrodes, the connection electrode and the bridge electrode may be made from transparent materials, e.g., indium tin oxide (ITO) layer or other transparent conductive layers. The insulation layer 106 may be made from transparent materials, e.g., transparent optical adhesives.

In this embodiment, the first, second electrical conductive electrodes are covered over a surface, e.g., an upper surface, of the substrate 102 and not covered over the remaining surface, e.g., a lower surface, of the substrate 102.

The through hole 110 of the insulation layer 106 in FIG. 2 is in the shape of a square or a rectangle conventionally. When the electrical conductive electrode 104 is in the shape of a trapezoid as illustrated in FIG. 3, a safe design distance (r), e.g., a processing tolerance, is applied between an edge of the through hole 110a and an edge of the electrical conductive electrode 104 to assure the through hole 110a being formed within the electrical conductive electrode 104. For example, at least a safe design distance (r) is formed between a boundary edge of the through hole 110a and an immediately-adjacent contour edge of a section of the electrical conductive electrode 104 to assure the through hole 110a being formed within the corresponding section of the electrical conductive electrode 104. With this regard, a minimum interval D1 between an immediately-adjacent pair of through holes 110a is obtained when an edge of the through hole 110a is distant from the two second contour edges 114b by the safe design distance (r).

Figure 4:
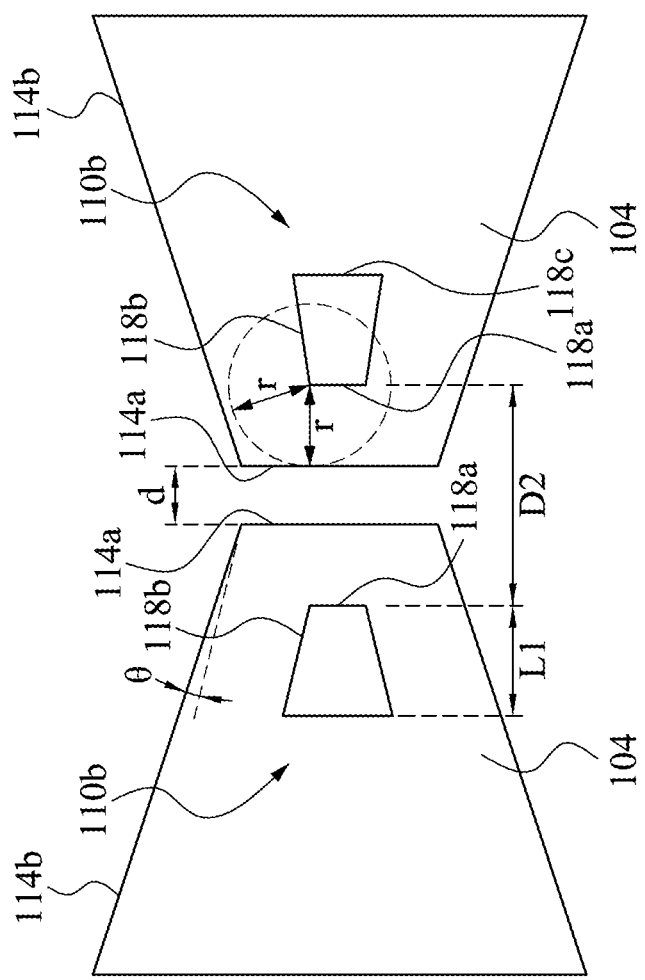
FIG. 4 illustrates an enlarged view of the touch sensing structure according to another embodiment of the present disclosure.

In order to shorten the interval between the two through holes, a new design rule is proposed for the through hole. Reference is made to FIG. 4, the new design rule shortens the interval between the two through holes without changing an occupancy area of the through hole, e.g., an occupancy area of the through hole 110b in FIG. 4 is equal to an occupancy area of the through hole 110a in FIG. 3. The new through hole 110b has a shortened first boundary edge 118a, e.g., compared with the through hole 110a, and the first boundary edge 118a is distant from an immediately-adjacent first contour edge 114a by a safe design distance (r).

The new through hole design rule may further include other rules, e.g., an included angle between the second boundary edge 118b and an immediately-adjacent second contour edge 114b is smaller than 10 degrees. When the included angle is equal to 0 degree, the second boundary edge 118b of the through hole 110b is in parallel with the immediately-adjacent second contour edge 114b. In sum, the second boundary edge 118b of the through hole 110b is still distant from the immediately-adjacent second contour edge 114b by greater than or equal to a safe design distance (r).

Reference is made to FIGS. 3 and 4, a profile of the through hole 110b is designed to be closer to the electrical conductive electrode 104 such that the first boundary edge 118a can be closer to the immediately-adjacent first contour edge 114a by exactly the safe design distance (r). Therefore, a minimum interval D2 between two through holes 110b can be:

$$D2=2r+d,$$

wherein the distance d is an interval between two immediately-adjacent electrical conductive electrodes 104.

Assuming that the distance d in FIGS. 3 and 4 is the same, the minimum interval D2 between two through holes 110b is smaller than the minimum interval D1 between the two through holes 110a. Because the through hole 110a has its boundary edge distant from the contour edge 114a by greater than the safe design distance (r), the minimum interval D1 between the two through holes 110a is greater than (2r+d).

While comparing the differences between FIG. 3 and FIG. 4, the include angle θ (or referred to as a bias angle) between the boundary edge of the through hole 110a (the dash-line in FIG. 3 is parallel to the second contour edge 114b) and its immediately-adjacent contour edge 114b is greater than 10 degrees in FIG. 3, and the include angle θ between the second boundary edge 118b of the through hole 110b and its immediately-adjacent second contour edge 114b is smaller than 10 degrees in FIG. 4 (the dash-line in FIG. 4 is parallel to the second boundary edge 118b). The through hole 110b has its first boundary edge 118a smaller than its third boundary edge 118c and thus forms a isosceles trapezoid while the through hole 110a is in the shape of a square or a rectangle. And the through hole 110b has a length L1 that is greater than any edges of the through hole 110a.

Although the through hole 110b in FIG. 4 has a profile similar to a profile of the electrical conductive electrode 104, the new through hole design does not restrict the through hole to be similar to a trapezoid or an isosceles trapezoid.

Figure 5:
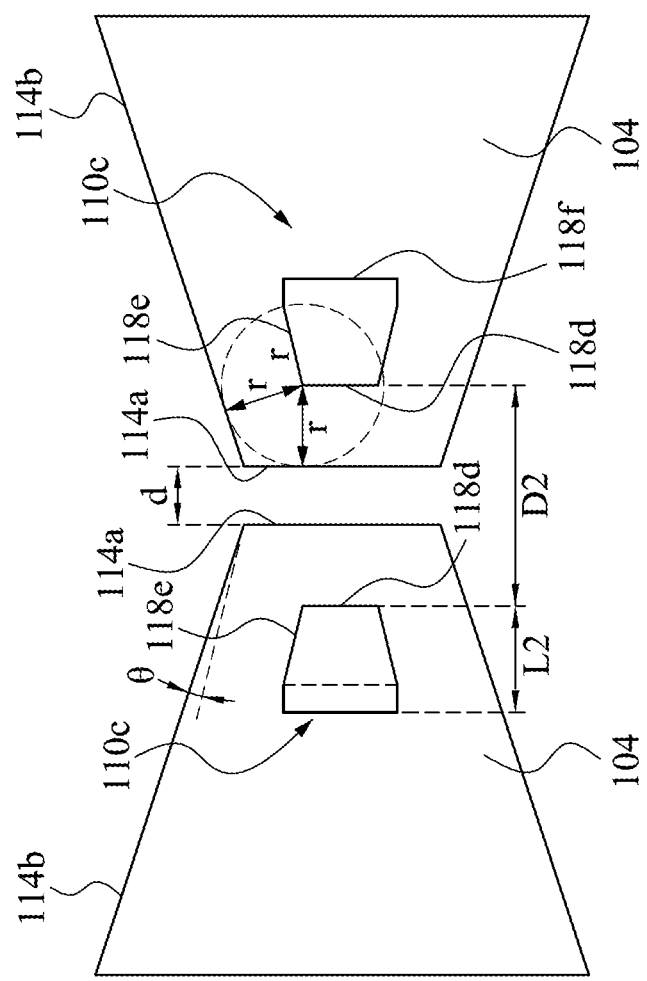
FIG. 5 illustrates an enlarged view of the touch sensing structure according to still another embodiment of the present disclosure.

The through hole 110c as illustrated in FIG. 5 is in the shape of a hexagon or a combination of an isosceles trapezoid and a rectangle. The through hole 110c has its first boundary edge 118d distant from the immediately-adjacent first contour edge 114a by the safe design distance (r). An included angle θ between the second boundary edge 118e of the through hole 110c and the immediately-adjacent second contour edge 114b is smaller than 10 degrees (including the parallel relationship, i.e., the included angle θ is zero). In addition, the second boundary edge 118e of the through hole 110c is distant from the immediately-adjacent second contour edge 114b by the safe design distance (r).

While comparing the differences between FIG. 4 and FIG. 5, the first boundary edge 118d of the through hole 110c is greater than the first boundary edge 118a of the through hole 110b, and the second boundary edge 118e of the through hole 110c is distant from the immediately-adjacent second contour edge 114b by exactly the safe design distance (r). The through hole 110c may be a combination of an isosceles trapezoid and a rectangle, or the rectangle can be replaced by other shapes, e.g., the third boundary edge 118f can be a curved-line as long as it is distant from an immediately-adjacent contour edge of the electrical conductive electrode 104 by greater than or equal to the safe design distance (r). The through hole 110c is designed to shorten a length L2, e.g., compared with the length L1 of the through hole 110b, so as to move the through hole 110c closer to the first contour edge 114a as a whole.

Reference is made to FIGS. 3-5. In sum, a common design rule for the through hole is to have the boundary edge of the through hole distant from its immediately-adjacent contour edge by greater than or equal to the safe design distance (r), and the occupancy areas of the through holes (110a, 110b, 110c) are kept the same. Based upon the common design rule, the through holes (110b, 110c) is modified on their profiles or shapes to further shorten an interval between two through holes (compared with the through hole 110a), thereby reducing an impedance of the bridge electrode passing through the two through holes. Comparing with the actual verifications, the bridge electrode passing through the two through holes (110b or 110c) has an impedance that is about 10% lower than the impedance of the bridge electrode passing through the two through holes 110a.

The design rule for the through hole disclosed herein modifies a profile of the through hole, but not being limited to a hexagon or a trapezoid. As long as the through hole has its boundary edge distant from an immediately-adjacent contour edge by greater than or equal to a safe design distance (r), and an included angle between the second boundary edge of the through hole and its immediately-adjacent second contour edge is smaller than 10 degrees, an interval between two through holes can be further shortened to reduce the impedance of the bridge electrode passing through the two through holes.

In sum, the touch sensing structure for a display panel is implemented with the new through hole design rule to modify a profile of the through hole closer to a profile of the electrical conductive electrode on which the through hole is formed, so as to further shorten an interval between two through holes, thereby reducing the impedance of the bridge electrode passing through the two through holes.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch sensing structure for a display panel comprising:
   a substrate;
   a first electrical conductive electrode comprising a plurality of first sections to cover over the substrate, the first sections are interconnected by a connection electrode;
   a second electrical conductive electrode comprising a plurality of second sections to cover over the substrate, wherein each immediately-adjacent pair of the second sections has an immediately-adjacent pair of first contour edges, and each second section has second contour edges connected to a corresponding one of the first contour edges;
   an insulation layer covered over the first, second electrical conductive electrodes and the connection electrode; and
   a bridge electrode extending beyond the connection electrode to electrically interconnect each immediately-adjacent pair of the second sections, the bridge electrode has two opposite ends passing through two through holes of the insulation layer to electrically interconnect each immediately-adjacent pair of the second sections, wherein each through hole has a first straight boundary edge and a second straight boundary edge that are connected to each other and not in parallel with each other, the first straight boundary edge is in substantially parallel with a closer one of the immediately-adjacent pair of first contour edges, an included angle between the second straight boundary edge and an immediately-adjacent one of the second contour edges is smaller than 10 degrees such that each through hole has a profile closer to a profile of a corresponding one of the second sections of the second electrical conductive electrode.

2. The touch sensing structure of claim 1, wherein the second straight boundary edge is in parallel with the immediately-adjacent one of the second contour edges.

3. The touch sensing structure of claim 1, wherein the first, second electrical conductive electrodes cover a surface of the substrate, and do not cover the remaining surfaces of the substrate.

4. The touch sensing structure of claim 1, wherein each through hole is in the shape of an isosceles trapezoid.

5. The touch sensing structure of claim 1, wherein each through hole is in the shape of a hexagon.

6. The touch sensing structure of claim 5, wherein the hexagon is a combination of an isosceles trapezoid and a rectangle.

7. The touch sensing structure of claim 1, wherein the substrate is made from transparent materials.

8. The touch sensing structure of claim 1, wherein the first, second electrical conductive electrodes are made from transparent materials.

9. The touch sensing structure of claim 1, wherein the insulation layer is made from transparent materials.

* * * * *